Figure 1:
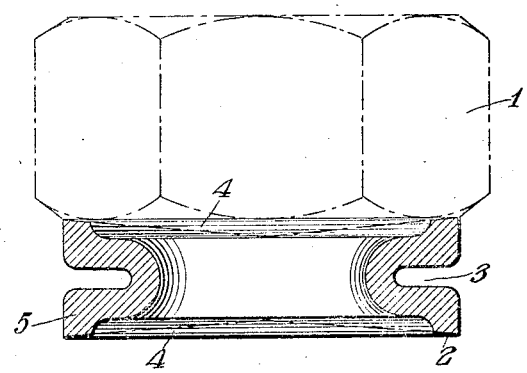

Dec. 29, 1925.                                                       1,567,649
A. G. E. HULTGREN ET AL

NUT LOCK

Original Filed June 7, 1922

INVENTORS
A.G.E. Hultgren
J.H.E. Thorén
BY
Rogers, Kennedy Campbell
ATTORNEYS.

Patented Dec. 29, 1925.

1,567,649

UNITED STATES PATENT OFFICE.

AXEL GUSTAF EMANUEL HULTGREN AND JOSEF HENRIK EMANUEL THORÉN, OF GOTTENBORG, SWEDEN, ASSIGNORS TO AKTIEBOLAGET SVENSKA KULLAGER-FABRIKEN, A CORPORATION OF SWEDEN.

NUT LOCK.

Original application filed June 7, 1922, Serial No. 566,534. Divided and this application filed February 2, 1924. Serial No. 690,193.

*To all whom it may concern:*

Be it known that we, AXEL GUSTAF EMANUEL HULTGREN and JOSEF HENRIK EMANUEL THORÉN, both subjects of the King of Sweden, and both residing at Gottenborg, Sweden, have invented certain new and useful Improvements in Nut Locks, of which the following is a specification, being a division of original application filed June 7, 1922, Serial No. 566.534.

This invention relates to means for locking nuts against unscrewing and comprises a springy part or elastic washer for co-operation between a threaded nut proper and the abutment onto which the nut is screwed.

The object of the invention is to prevent the nut, by means of the friction created in tightening between the springy part the nut and the abutment, from working loose and to thereby positively and effectively lock the nut, notwithstanding the relative axial movements, due to axial vibration between the bolt and the abutment or part onto which the nut is screwed.

The invention consists, essentially, in a strong ring-like or annular spring washer having, at its bearing faces, at or near the outer circumference of the nut, annular bearing surfaces of comparatively large extension in radial direction. The force of the nut will thus be brought to bear on the abutment or part onto which it is screwed at the annular bearing surface where the moment of frictional force and, on account of the rigidity of the springy part, the pressure between the nut and the abutment is large so as to effectively lock the nut in position.

In the drawings accompanying this specification there is shown one practicable embodiment of the invention, in which drawings—

Figure 2:
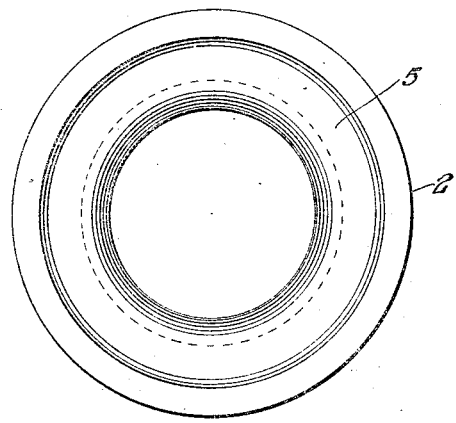

Figure 1 shows in axial section the improved washer or springy part, and the nut illustrated in outline, and Fig. 2 is a face view of the washer.

In the drawing, 1 represents in outline or shadow a nut for the purpose of illustrating the relative proportions, the washer 5 may assume to a nut, also certain other features which are described later. In cross section the washer is somewhat U-shaped, there being an annular shoulder, or bearing surface 2 at each side, one of these for bearing against the abutment onto which the nut is to be screwed, and the other for engaging such nut. This provides an annular bearing surface at each face of the washer at its outermost part, the structure being hollowed out inwardly of such annular faces, to form cavities 4. Between the two annular bearing surfaces, the washer is formed with an annular outwardly directed channel 3 which extends inwardly of the inner edges of the bearing surfaces 2, thereby giving the structure the desired springy or resilient action necessary to exert a continuous elastic pressure between the nut and the abutment for preventing the unintentional turning or unscrewing of the nut.

It is to be noted that the lever arm of frictional force is large where the annular shoulders 2 engage the nut and the abutment respectively.

It has been found preferable in practice to form the bearing surfaces 2 with a slight outwardly flaring bevel, so that when the spring washer is deformed or sprung when the nut is tightened up, these beveled bearing surfaces will straighten out and will bear flatly and firmly against the nut and abutment respectively.

We claim as our invention:

1. A nut-lock comprising a resilient annular washer of U-shape in cross section, having near its circumference two annular surfaces for engaging the nut and the part to be fastened respectively, and formed with an open annular channel the depth of which is greater than the radial width of said annular surfaces, thereby giving the structure resiliency.

2. A nut-lock as set forth in claim 1, the annular surfaces of which are beveled to flare outwardly; whereby when the nut is tightened up, the said surfaces will flatten out and will contact throughout their extent with the engaging parts.

3. A nut-lock comprising an annular resilient washer of U-shape in cross section, and having near its circumference two annular surfaces for engaging the nut and the part to be fastened respectively, said washer being formed between said annular surfaces with an annular outwardly opening channel extending inwardly of the inner edges of the annular surfaces to give resiliency to the structure.

In testimony whereof we have affixed our signatures hereto.

AXEL GUSTAF EMANUEL HULTGREN.
JOSEF HENRIK EMANUEL THORÉN.